(12) United States Patent
Roehm et al.

(10) Patent No.: US 8,528,658 B2
(45) Date of Patent: Sep. 10, 2013

(54) POWER DRILL

(75) Inventors: Heiko Roehm, Stuttgart (DE); Tobias Herr, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 278 days.

(21) Appl. No.: 12/951,725

(22) Filed: Nov. 22, 2010

(65) Prior Publication Data

US 2011/0147022 A1    Jun. 23, 2011

(30) Foreign Application Priority Data

Dec. 18, 2009    (DE) .................... 10 2009 054 930

(51) Int. Cl.
*B25B 21/02*    (2006.01)
(52) U.S. Cl.
USPC ............................................ 173/47; 173/176
(58) Field of Classification Search
USPC ............... 173/47, 48, 176, 178, 180; 279/60, 279/61, 62; 192/139
See application file for complete search history.

(56) References Cited

U.S. PATENT DOCUMENTS

| | | | | |
|---|---|---|---|---|
| 5,569,256 A | * | 10/1996 | Vaughn et al. | 606/80 |
| 6,688,406 B1 | * | 2/2004 | Wu et al. | 173/48 |
| 6,691,796 B1 | * | 2/2004 | Wu | 173/48 |
| 7,201,235 B2 | * | 4/2007 | Umemura et al. | 173/217 |
| 7,455,123 B2 | * | 11/2008 | Aeberhard | 173/178 |
| 2004/0231952 A1 | | 11/2004 | Nakamura et al. | |
| 2004/0245005 A1 | * | 12/2004 | Toyama et al. | 173/48 |
| 2008/0210450 A1 | | 9/2008 | Spielmann et al. | |

FOREIGN PATENT DOCUMENTS

AU    2007200080 A1    7/2008

* cited by examiner

*Primary Examiner* — Alexandra Elve
*Assistant Examiner* — Nathaniel Chukwurah
(74) *Attorney, Agent, or Firm* — Kenyon & Kenyon LLP

(57) ABSTRACT

The invention relates to a power drill, having a tool-clamping device that is fastened to a spindle shaft, having a torque clutch that includes an axially movable clutch plate on which an axial force is exerted by a plurality of compression springs that cooperate at least indirectly with an adjusting nut situated on a housing component. The compression springs are accommodated in first recesses embodied in the longitudinal direction of the housing component. A device for axially moving an axial bearing situated on the spindle shaft, is provided at the end of the spindle shaft oriented toward the tool-clamping device. According to the invention, on its side oriented toward the clutch plate, the device for axially moving the axial bearing has at least one actuating section that is situated in a second recess of the housing component and on the side oriented toward the clutch plate, cooperates with an adjusting element for the device.

28 Claims, 3 Drawing Sheets

POWER DRILL

CROSS-REFERENCE TO RELATED APPLICATION

This application is based on German Patent Application 10 2009 054 930.7 filed on Dec. 18, 2009.

BACKGROUND OF THE INVENTION

1. Field of the Invention

The invention relates to a power drill.

2. Description of the Prior Art

A power drill of this kind is already generally known. The power drill has a torque clutch that makes it possible in particular to also use the drill as a screwdriver. In this operating mode, the torque clutch limits the torque transmitted to the screw to a reasonable quantity. For this purpose, the known power drill has a user-actuated adjusting ring that adjusts the amount of torque that can be transmitted. This adjusting ring moves an adjusting nut, which is situated on a transmission housing and in particular, acts directly on axially situated compression springs that in turn cooperate with an axially movable clutch plate. In this case, the compression springs are guided between threaded segments of the transmission housing on which the adjusting nut is also situated.

In an impact drill, it is also known for the spindle shaft bearing, which is situated at the end oriented toward a tool-clamping unit, to move axially in the impact drilling mode so that the bearing functions as a movable bearing, permitting an impact mechanism to act on the spindle shaft. For this purpose, a device is usually provided, which axially adjoins the torque clutch.

OBJECT AND SUMMARY OF THE INVENTION

Based on the above-indicated prior art, the object underlying the invention is to modify a power drill so that a particularly compact axial design of the power drill is achieved.

According to the invention, a device for axially moving the bearing for the spindle shaft is positioned so that it at least partially overlaps with the device for adjusting the torque of the torque clutch. For this purpose, the device for moving the axial bearing, on its side oriented toward the clutch plate, has at least one actuating section that is situated in a second recess of the housing component, which is particularly embodied as the transmission housing, and on the side oriented toward the clutch plate, cooperates with an adjusting element for the device for moving the axial bearing. In other words, at least one actuating section is situated in the region of the housing component in which the compression springs are also situated.

According to an embodiment of the invention that is particularly advantageous from a structural standpoint, the device has a plurality of strut-like actuating sections that are situated at equidistant angular intervals from one another and the second recesses at least partially accommodate the strut-like actuating sections in a form-locked fashion. This makes it possible to transmit relatively high axial forces, with the guidance provided for the actuating sections also guiding them laterally.

In order to accommodate the actuating sections so as to achieve the axially short overall length, according to another provided embodiment, the adjusting nut has a root circle diameter that is greater than the envelope curve of the installed compression springs and the strut-like actuating sections extend radially inside the root circle diameter of the adjusting nut.

In order to transmit the axial force from the adjusting nut to the compression springs, in a structural modification of the invention, the adjusting nut cooperates with a spring-retaining element that has a section, which protrudes radially inward and cooperates with the compression springs.

In this case, in order to prevent the compression springs from buckling laterally upon exertion of an axial force on the compression springs, and to simultaneously achieve an optimum frictional, nonpositive engagement between the compression springs and the clutch plate, in another advantageous provided embodiment, the inward-protruding section has pin-like extensions, each with a respective compression spring guided on it, and the side of the clutch plate oriented away from the spring-retaining element is provided with force-transmitting means, in particular balls, whose radial distance from the spindle shaft corresponds approximately to the distance of the compression springs from the spindle shaft.

To immobilize the clutch device, particularly during impact drilling mode, so as to enable a particularly good introduction of force from the adjusting nut to the clutch plate, another embodiment of the invention includes the provision that the spring-retaining element has at least one support section that is aligned with the adjusting nut in the axial direction and rests against the clutch plate in order to immobilize the coupling plate in the axial direction.

In order to minimize the number of components used and thus to enable an optimum design of the power drill from a production engineering standpoint, according to another advantageous embodiment, the housing component is a transmission housing.

In this case, the transmission housing is relatively convenient to produce from a production engineering standpoint if it is embodied in the form of a pressure die-cast part composed of metal (e.g. aluminum, magnesium, or zinc) or a pressure die-cast part composed of plastic.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

Figure 1:
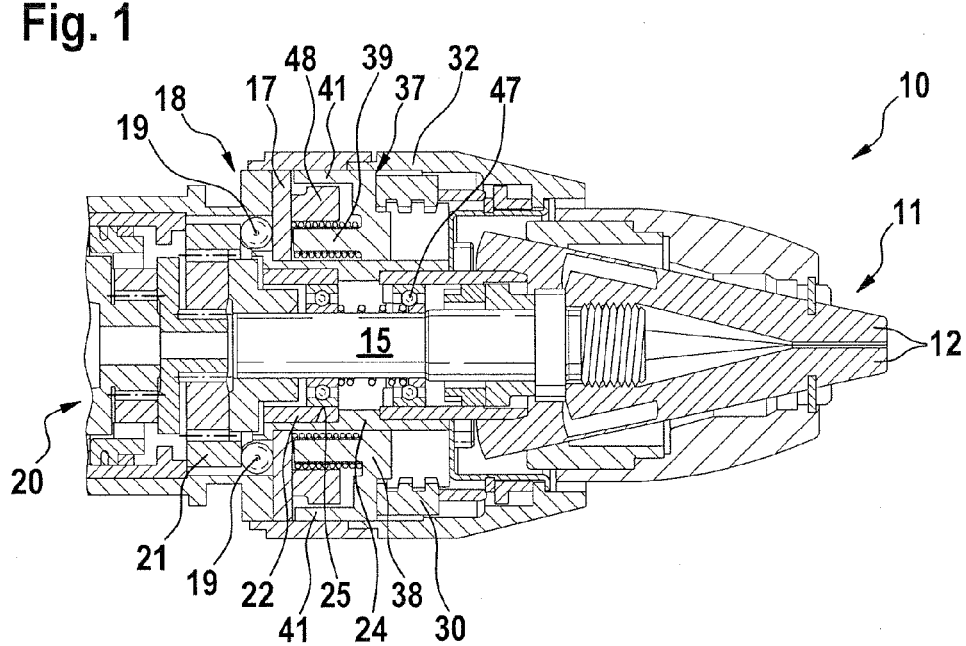
FIG. 1 is a longitudinal section through the front part of a power drill according to the invention in a first sectional plane.
Figure 2:
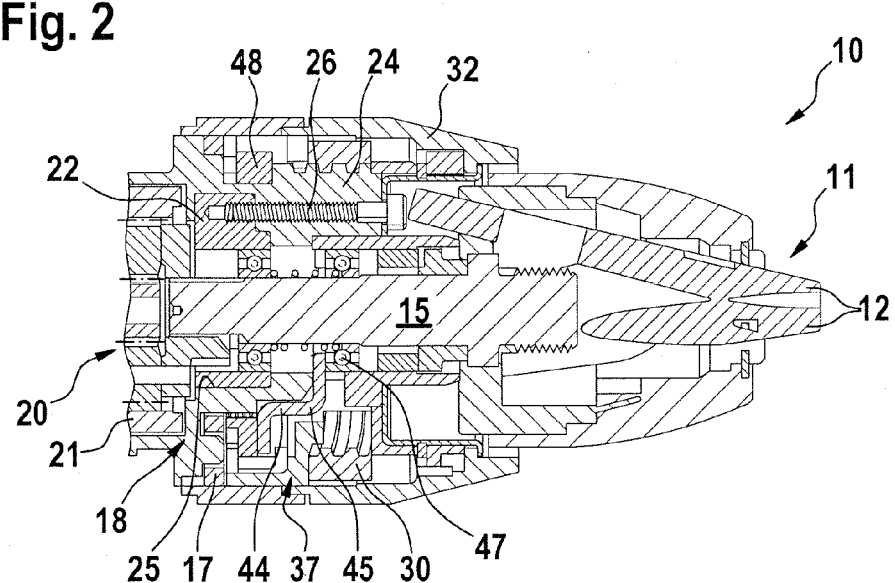
FIG. 2 is a longitudinal section through the front part of a power drill according to the invention in a second different sectional plane than in FIG. 1.

FIGS. 1 and 2 show the axial front part of a power drill 10 according to the invention. The power drill 10 is in particular embodied as a cordless drill and has an impact drilling function as well as a screwdriving and drilling function. The power drill 10 has a tool-clamping device 11 that in a known way, includes in particular three clamping jaws 12 arranged at equidistant angular intervals from one another. The clamping jaws 12 can be opened and closed in a known way in order to accommodate a suitable tool such as a drill bit or screwdriving bit between the clamping jaws 12.

The tool-clamping device 11 is fastened to the end of a spindle shaft 15 oriented toward it. The other end of the spindle shaft 15 oriented away from the tool-clamping device 11 is operatively connected to a clutch plate 17, with the clutch plate 17 situated in an axially movable fashion. The clutch plate 17 is a component of a torque clutch 18, which has a plurality of balls 19, preferably six of them, which are situated at equidistant angular intervals from one another on the side of the clutch plate 17 oriented away from the tool-clamping device 11. The balls 19 are operatively connected to a detent sleeve 21 that is connected to an output gear of an in particular multi-stage transmission 20 of the power drill 10, preferably embodied in the form of a planetary gear set. The transmission 20 is in turn connected to the drive motor of the power drill 10 (not shown).

The spindle shaft 15 is encompassed, with an interposed bearing, by a clamping ring 22, which is in turn radially encompassed by a transmission housing 24. For this purpose, the transmission housing 24, as is particularly visible in FIGS. 1 and 2, has a recess 25 on the inside so that the transmission housing 24 can be connected to the clamping ring 22 by means of fastening screws 26 that extend through the transmission housing 24 in through bores. It should also be noted that the clutch plate 17 is guided radially in the transmission housing 24.

The transmission housing 24 is in particular embodied in the form of a pressure die-cast part composed of metal (e.g. aluminum, magnesium, or zinc) or a pressure die-cast part composed of plastic. As is depicted the most clearly in FIGS. 3 through 5, the end of the transmission housing 24 oriented toward the tool-clamping device 11 is provided with a threaded section 27 that has three threaded struts 28 situated at equidistant angular intervals from one another. The threaded struts 28 with their external thread 29 serve to fasten and axially guide an adjusting nut 30 (see FIGS. 1, 2, and 4). The adjusting nut 30 is likewise a component of the torque clutch 18; it cooperates with an adjusting ring 32 and can be actuated by means of it. As is depicted most clearly in FIGS. 3 through 5, the transmission housing 24 has first recesses 33 extending in the longitudinal direction of the transmission housing 24, in which a number of compression springs 35 in particular corresponding to the number of balls 19, i.e. six compression springs 35 in the exemplary embodiment, are situated at equidistant angular intervals from one another. The compression springs 35 and the balls 19 are advantageously arranged so that they are aligned with one another when the detent sleeve 21 of the torque clutch 18 is not slipping. In this case, viewed in the radial direction, the compression springs 35 all extend inside the root circle of the external thread 29 of the transmission housing 24 and are spaced apart from the spindle shaft 15 by approximately the same radial distance as the balls 19. The one end of each compression spring 35 acts on the clutch plate 17. An axial force is exerted on the compression springs 35 by means of a spring-retaining element 37 that is coupled to the adjusting nut 30. For this purpose, the spring-retaining element 37, as shown in FIG. 1, has a section 38 protruding radially inward, which has a pin-like extension 39 for each compression spring 35. Each extension 39 accommodates and guides a respective compression spring 35. Aligned with the adjusting nut 30, the spring-retaining element 37 also preferably has a plurality of support regions 41 situated at equidistant angular intervals from one another, which extend parallel to the extensions 39 and rest against the clutch plate 17 when the clutch plate 17 is in an immobilized position.

Figure 3:
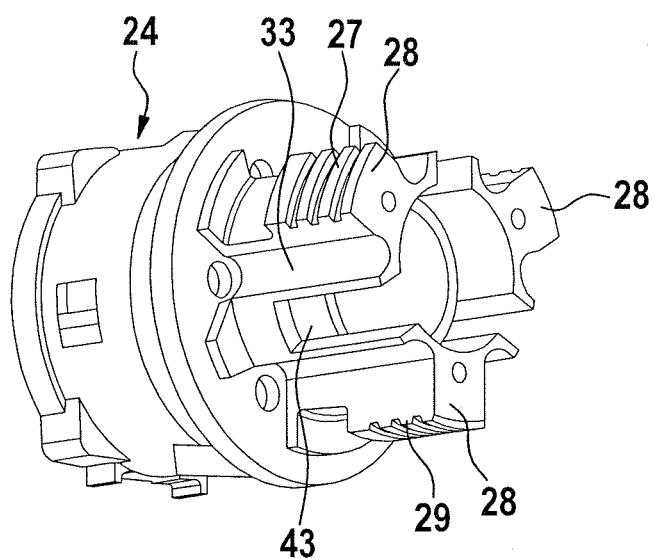
FIG. 3 is a perspective view of the front part of a transmission housing.
Figure 4:
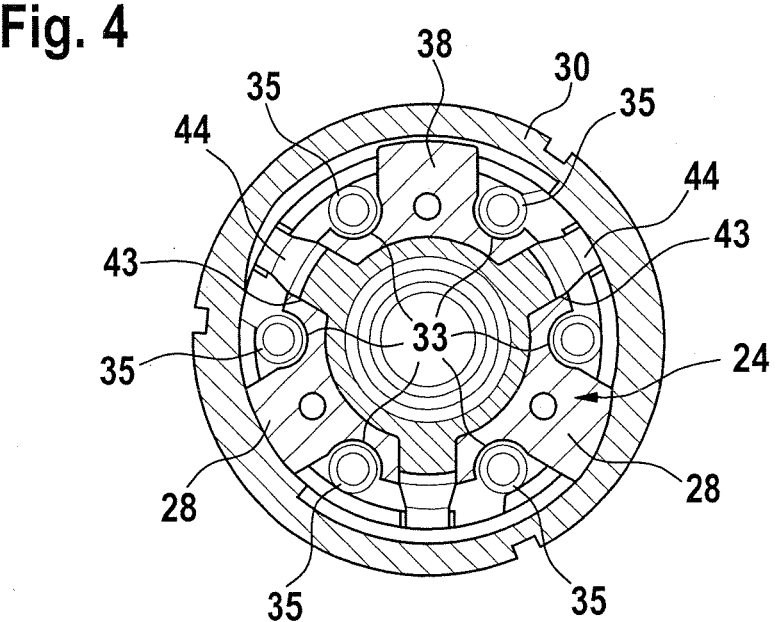
FIG. 4 is a cross-section through the power drill according to FIGS. 1 and 2, in the vicinity of the transmission housing.

In addition to the first recesses 33, the transmission housing 24 has second recesses 43. The second recesses 43, which are depicted most clearly in FIGS. 3 and 4, are likewise situated at equidistant angular intervals from one another in the transmission housing 24 and in particular, are embodied as groove-shaped. The second recesses 43 serve to at least partially accommodate strut-like actuating sections 44 in a form-locked fashion.

The actuating sections 44 are components of a bearing holder 45 (FIGS. 1 and 2) that is provided to axially move an axial bearing 47. The axial bearing 47 in this case is situated at—and provides guidance for—the end of the spindle shaft 15 oriented toward the tool-clamping device 11. The ends of the actuating sections 44 oriented away from the axial bearing 47 rest against a cam ring 48 that functions as an adjusting element and is likewise coupled to the adjusting ring 32, particularly in a form-locked fashion. In this case, the cam ring 48 is used to axially move the actuating sections 44 and bearing holder 45 so that the axial bearing 47 functions as a movable bearing for the impact drilling mode of the power drill 10 and functions as a fixed bearing for the screwdriving and drilling modes.

Figure 5:
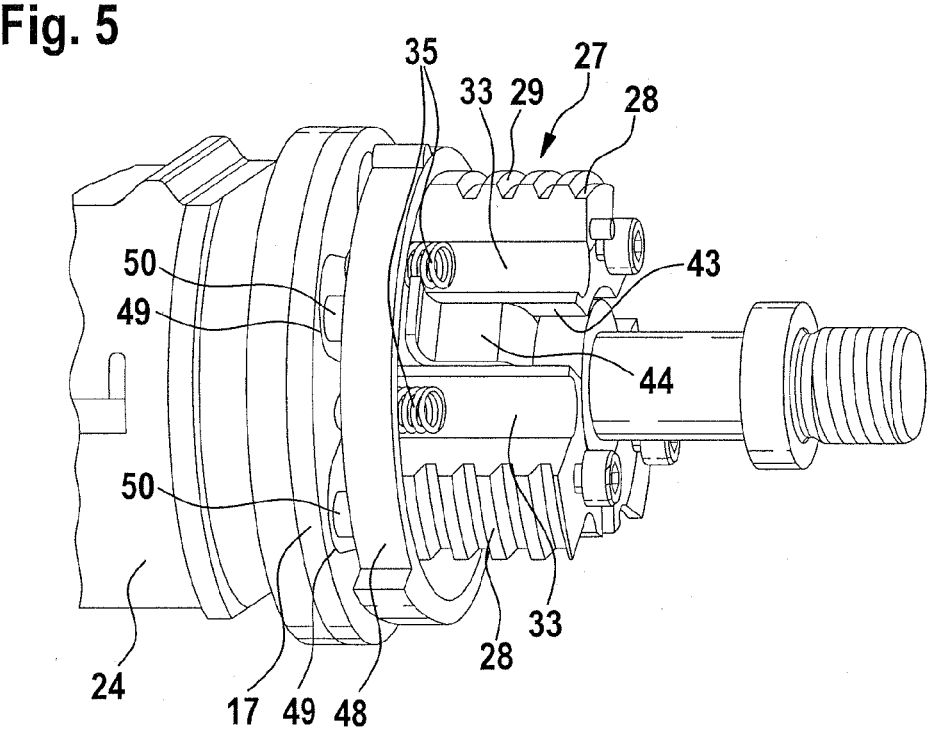
FIG. 5 is a perspective depiction of the region of the front transmission housing, with various parts not depicted for the sake of clarity.

In drilling mode, as shown in FIG. 5, the bearing holder 45 rests with its actuating sections 44 axially against the transmission housing 24 via the cam ring 48; for this purpose, the clutch plate 17 has recesses 49 so that spacer elements 50 formed onto the cam ring 48 can cooperate with the transmission housing 24. In order to increase the transmittable torque, the adjusting ring 32 is rotated so that the adjusting nut 30 is moved axially in the direction of the clutch plate 17. As a result, the compression springs 35 exert an increased axial compressive force against the clutch plate 17 via the spring-retaining element 37.

In the drilling mode of the power drill 10, the support regions 41 and/or the extensions 39 in turn press the clutch plate 17 until it is virtually locked in place, thus immobilizing the torque clutch 18.

The foregoing relates to preferred exemplary embodiments of the invention, it being understood that other variants and embodiments thereof are possible within the spirit and scope of the invention, the latter being defined by the appended claims.

The invention claimed is:

1. A power drill, comprising:
a tool-clamping device that is fastened to a spindle shaft;
a torque clutch that includes an axially movable clutch plate on which an axial force is exerted by a plurality of compression springs that cooperate at least indirectly with an adjusting nut situated on a housing component, with the compression springs accommodated in first recesses in a longitudinal direction of the housing component; and
a device for axially moving an axial bearing, the axial bearing situated on and providing guidance for the spindle shaft oriented towards the tool-clamping device, the device having a side oriented towards the clutch plate,
wherein the device has at least one strut-like actuating section, the actuating section being situated in a second recess of the housing component and having an end oriented away from the axial bearing towards the clutch plate, such that actuating section cooperates with an adjusting element for adjusting the device; and wherein the axial bearing is at least one of a) movable during impact drilling of the power drill, and b) fixed during screwdriving and drilling of the power drill.

2. The power drill as recited in claim 1, wherein the strut-like actuating sections are situated at equidistant angular intervals from one another and the second recesses at least partially accommodate the strut-like actuating sections in a form locked fashion.

3. The power drill as recited in claim 2, wherein the adjusting nut has a root circle diameter that is greater than an envelope curve of installed compression springs and the strut-like actuating sections extend radially inside the root circle diameter of the adjusting nut.

4. The power drill as recited in claim 3, wherein the adjusting nut cooperates with a spring-retaining element that has a section that protrudes radially inward, which section cooperates with the compression springs.

5. The power drill as recited in claim 4, wherein the section that protrudes radially inward has pin-like extensions, each with a respective compression spring guided thereon, and a side of the clutch plate oriented away from the spring-retaining element is provided with force-transmitting elements, in particular balls, which have a radial distance from the spindle shaft that corresponds approximately to a distance of the compression springs from the spindle shaft.

6. The power drill as recited in claim 5, wherein aligned with the adjusting nut in an axial direction, the spring-retaining element has at least one support region that rests against the clutch plate in order to immobilize the clutch plate in an axial direction.

7. The power drill as recited in claim 6, wherein a number of force-transmitting elements corresponds to a number of compression springs and the force-transmitting elements are aligned with the compression springs when the torque clutch is not slipping.

8. The power drill as recited in claim 4, wherein aligned with the adjusting nut in an axial direction, the spring-retaining element has at least one support region that rests against the clutch plate in order to immobilize the clutch plate in an axial direction.

9. The power drill as recited in claim 8, wherein a number of force-transmitting elements corresponds to a number of compression springs and the force-transmitting elements are aligned with the compression springs when the torque clutch is not slipping.

10. The power drill as recited in claim 8, wherein the housing component is a transmission housing.

11. The power drill as recited in claim 10, wherein the transmission housing is situated on a clamping ring which is affixed to the transmission housing with the clamping ring situated radially inside the adjusting nut.

12. The power drill as recited in claim 11, wherein the transmission housing is embodied as a pressure die-cast part composed of aluminum or plastic.

13. The power drill as recited in claim 5, wherein a number of force-transmitting elements corresponds to a number of compression springs and the force-transmitting elements are aligned with the compression springs when the torque clutch is not slipping.

14. The power drill as recited in claim 6, wherein the housing component is a transmission housing.

15. The power drill as recited in claim 14, wherein the transmission housing is situated on a clamping ring which is affixed to the transmission housing with the clamping ring situated radially inside the adjusting nut.

16. The power drill as recited in claim 15, wherein the transmission housing is embodied as a pressure die-cast part composed of aluminum or plastic.

17. The power drill as recited in claim 1, wherein the housing component is a transmission housing.

18. The power drill as recited in claim 17, wherein the transmission housing is situated on a clamping ring which is affixed to the transmission housing with the clamping ring situated radially inside the adjusting nut.

19. The power drill as recited in claim 18, wherein the transmission housing is embodied as a pressure die-cast part composed of aluminum or plastic.

20. The power drill as recited in claim 17, wherein the transmission housing is embodied as a pressure die-cast part composed of aluminum or plastic.

21. The power drill as recited in claim 1, wherein the torque clutch further comprises a plurality of balls which are operatively connected to a detent sleeve.

22. The power drill as recited in claim 1, wherein the device for axially moving an axial bearing is embodied as a bearing holder.

23. A power drill, comprising:
a tool-clamping device that is fastened to a spindle shaft;
a torque clutch that includes an axially movable clutch member on which an axial force is exerted by a plurality of compression springs that cooperate at least indirectly with a first adjusting element for adjusting the torque clutch, the first adjusting element being situated on a housing component, with the compression springs accommodated in first recesses embodied in a longitudinal direction of the housing component; and
a device for axially moving an axial bearing, the axial bearing situated on and providing guidance for the spindle shaft, the device having a side oriented towards the clutch member;
wherein the device has at least one strut-like actuating member, the actuating member being situated in a second recess of the housing component and having an end oriented away from the axial bearing towards the clutch member; and
wherein the actuating member is configured to cooperate with a second adjusting element for axially moving the axial bearing such that the axial bearing is at least one of a) movable during impact drilling of the power drill, and b) fixed during screwdriving and drilling of the power drill.

24. The power drill as recited in claim 23, wherein the first adjusting element is configured to be actuated by a third adjusting element.

25. The power drill as recited in claim 24, wherein the second adjusting element is configured to be actuated by the third adjusting element.

26. The power drill as recited in claim 23, wherein the second adjusting element is embodied as a cam ring.

27. The power drill as recited in claim 23, wherein in a drilling mode, the actuating member of the device rests axially against the housing component via the second adjusting element.

28. The power drill as recited in claim 23, wherein the clutch member has recess such that, in a drilling mode, space elements formed onto the second adjusting element cooperate with the housing component.

* * * * *